United States Patent [19]
Dean

[11] 3,758,254
[45] Sept. 11, 1973

[54] GRASPING PARISON PREFORM AT RIGHT ANGLE TO MOLD PARTING LINE

[75] Inventor: Jimmie L. Dean, Bartlesville, Okla.

[73] Assignee: Phillips Petroleum Company, Bartlesville, Okla.

[22] Filed: Jan. 26, 1972

[21] Appl. No.: 220,970

[52] U.S. Cl. 425/387 B, 425/DIG. 212, 425/DIG. 216
[51] Int. Cl. ............................................. B29d 23/03
[58] Field of Search ..................... 425/242 B, 302 B, 425/305 B, 324 B, 326 B, 326 BJ, 387 B

[56] References Cited
UNITED STATES PATENTS

| | | | |
|---|---|---|---|
| 3,662,049 | 5/1972 | Gilbert | 425/305 B |
| 3,587,133 | 6/1971 | Valyi | 425/387 B |
| 3,243,847 | 4/1966 | Fogelberg et al. | 425/326 B |
| 3,415,915 | 12/1968 | Lecluyse et al. | 425/387 B |
| 3,687,593 | 8/1972 | Gilbert | 425/387 B |
| 3,566,441 | 3/1971 | Thorn et al. | 425/387 B |

*Primary Examiner*—H. A. Kilby, Jr.
*Attorney*—Quigg and Oberlin

[57] ABSTRACT

An open end parison preform is heated to molding temperature preparatory to transfer to a molding station. The thus heated parison is grasped by a means which pinches one end together along a line which, on transfer of said thus grasped parison to said molding station, is perpendicular to the parting line of mold halves of said molding station.

7 Claims, 6 Drawing Figures

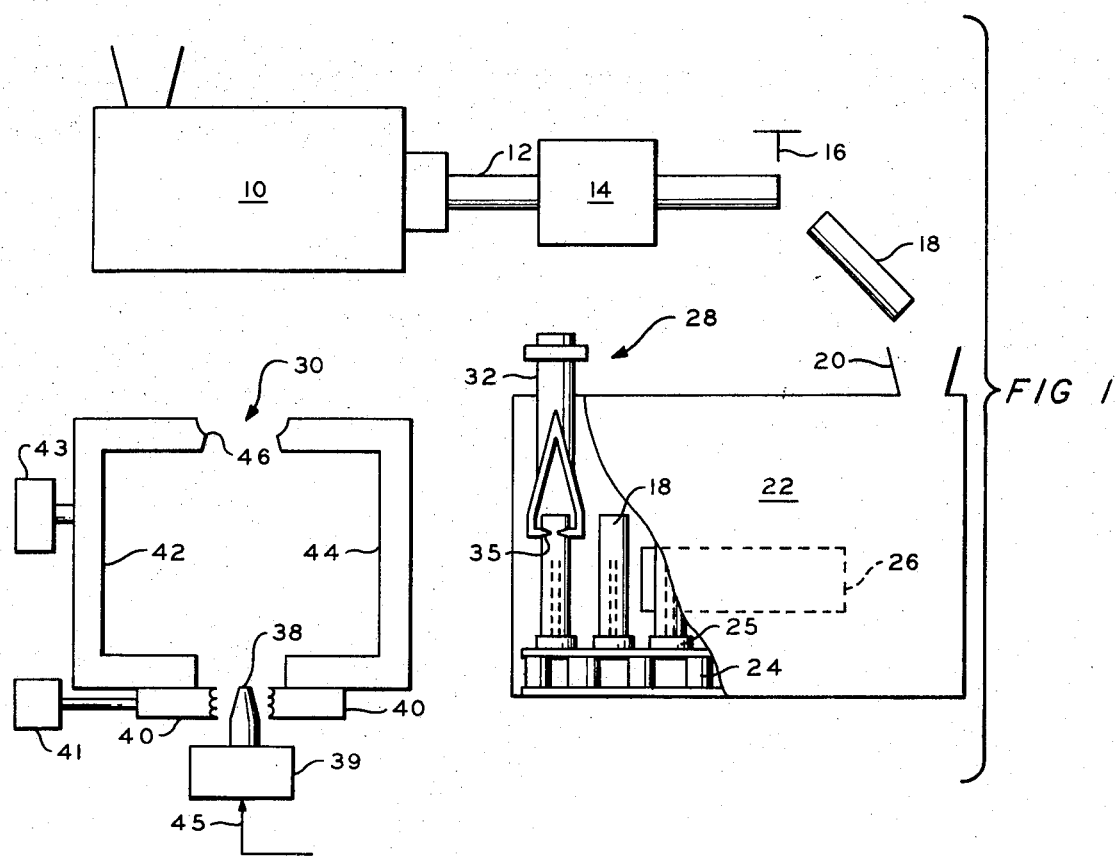
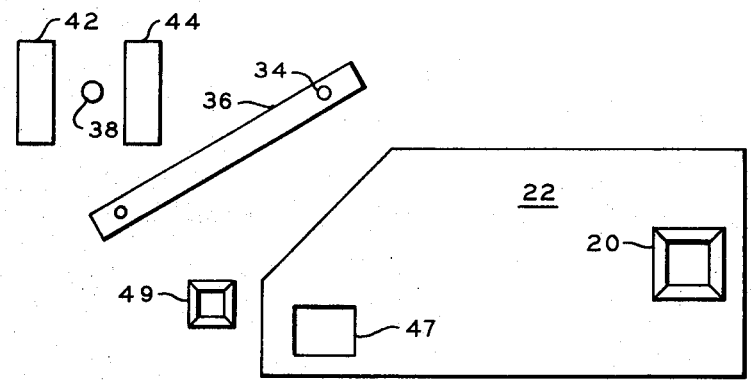
FIG. 2

GRASPING PARISON PREFORM AT RIGHT ANGLE TO MOLD PARTING LINE

BACKGROUND OF THE INVENTION

This invention relates to transferring a parison preform from a heating station to a molding station.

Blow molding hollow articles such as bottles and the like from reheated parison preforms so as to take advantage of the strengthening effect of molecular orientation is known in the art. Exemplary of such art is Wiley et al., U.S. Pat. No. 3,507,005. Inherent in such a molding technique is the necessity for transferring parisons from a heating means to a molding station. In laboratory or development scale equipment this can easily be accomplished either by hand or by mechanical means such as is shown in said Wiley et al patent. However, for such techniques to be competitive on a commercial scale it is necessary to reduce cycle time to a minimum, and insure virtually perfect reproducibility so that each article will be perfectly formed, thus keeping rejects to a minimum. One problem in this area is accurate alignment of the parison in the molding zone, particularly when carrying out the operation at a speed sufficiently high to be commercially feasible.

BRIEF SUMMARY OF THE INVENTION

It is an object of this invention to make possible the production of bottles and the like, from reheated parisons, at high production rates;

And it is yet a further object of this invention to reduce rejects and imperfectly formed bottles due to poor positioning of the parison in the molding station.

In accordance with this invention a vertically disposed open end tubular parison is grasped at the upper end thereof by means which press the opposed walls of this open end together preparatory to transfer into position between two mold halves, said grasping means being so aligned that said end of said parison is flattened in a direction which, on transfer of said thus grasped parison into position between said mold halves, in perpendicular to the parting line of said mold halves.

BRIEF DESCRIPTION OF THE DRAWINGS

In the drawings, forming a part thereof, wherein like reference characters denote like parts in the various views, FIG. 1 is a side elevation with parts out away of a blow molding apparatus having a parison transfer mechanism in accordance with the invention;

FIG. 2 is a plan view of the entire blow molding apparatus showing the relationship of the transfer means to the heating means in molding station;

DESCRIPTION OF THE PREFERRED EMBODIMENTS

Figure 4:
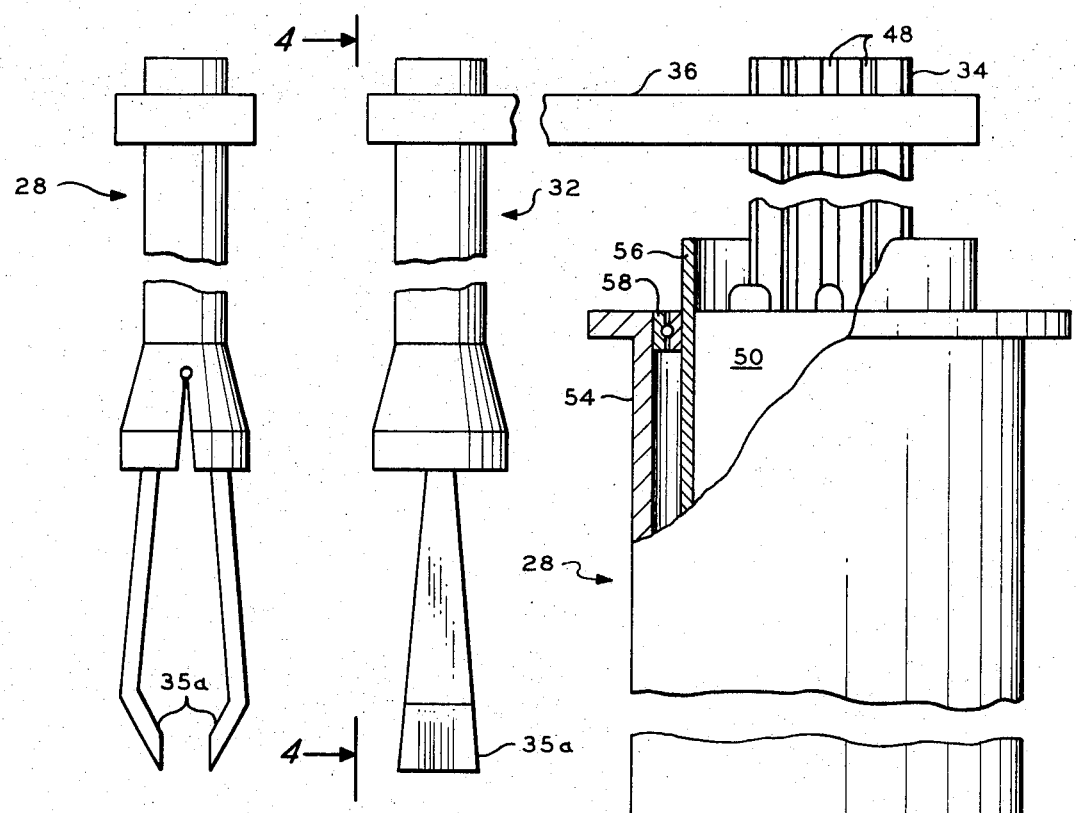
FIG. 4 is a view along the line 4—4 of FIG. 3.

The apparatus of this invention can be utilized in the blow molding of any type of hollow article from a tubular parison preform. Primarily, it is of utility in the forming of biaxially oriented hollow articles such as bottles from parison preforms which have been reheated to orientation temperature.

By orientation temperature it is meant that temperature at which a polymer on stretching exhibits an increase in strength. For crystalline polymers, this is generally in the range of 1° to 50°F, preferably 10° to 30°F, below the crystalline melting point. For amorphous polymers the temperature is generally within the range of 40° to 225°F, preferably 100° to 175°F, below the homogeneous melt point.

Exemplary crystalline polymers are polymers and copolymers of at least one mono-1-olefin having 2 to 8 carbon atoms per molecule, preferably polypropylene. Exemplary of amorphous polymers are polyvinylidene chloride, polystyrene, styrene/acrylonitrile/methacrylonitrile copolymers, various styrene/-butadiene-containing resins and the like.

Preferably, the transfer means is carried by a shaft riding on ball bearing splines. These ball bearing splines are commercially available, for instance, from Saginaw Steering Gear Division of General Motors Corporation.

Preferably, two ball nuts are utilized with one rotated slightly relative to the other so as to preload the balls against the inner race to eliminate angular backlash.

By grasping the vertically disposed open end parison by means of gripping members which apply pressure to opposed side walls of the open end so as to flatten and thus grip same, thereafter transferring said thus gripped parison into position in a molding zone with the longitudinal direction of said flattened end aligned at right angles to the parting line of the mold (parallel to the direction of travel of the mold halves), the parison is automatically aligned in both planes. That is, when the parison is grasped initially it may be tipped slightly so that, while its axis is exactly coincident with a plane straight down through the flattened area, the center of the parison may not be coincident with a plane straight down at right angles to the flattened area. Then if the parison is placed in the mold aligned with the flattened area parallel to the parting line of the mold, when the mold halves close they simply close on the parison in its existing alignment which, as noted hereinabove, is not straight. Similarly, if the mold halves close at any angle other than parallel to the longitudinal direction of the flattened area (that is, with the parting line perpendicular to the longitudinal direction of the flattened area) the parison will not be perfectly aligned. However, if the mold halves close in a direction parallel to the longitudinal direction of the flattened area the parison, which is already straight relative to a plane passing through said longitudinal direction of said flattened area, the parison will be forced into alignment relative to a plane perpendicular to the longitudinal direction of the flattened area. The closing movement of the gripping member automatically straightens parisons which are tilted in a direction perpendicular to the gripping members. Thus the combined action of the gripping members and the mold halves, when disposed in the relationship of the invention, straightens the parison no matter how it may be tilted in the heating means.

The advantages of the invention are intimately associated with molding wherein the article to be formed, in the instance of a bottle, is in an upside down position with the lower open end of the parison being placed over a neck-forming plug and the upper end being sealed and severed by the leading edges of bottom wall forming members of the mold. That is, by bottom wall forming members it is meant the upper members of the mold which form the bottom wall of the bottle.

It is particularly advantageous in the operation of this sytem for the parison to be preblown slightly prior to closing of the mold on it to effect sealing. Since the upper open end of the parison is already closed off as a result of being flattened by the gripping means, air or other blow fluid can be introduced through the thread forming plug. In the preferred embodiments where the parison is at orientation temperature the preblow fluid must be introduced under a greater pressure than the 3 to 6 psi normally used for preblowing conventional blow molding operations in which hot extruded parisons are used. Preblow pressure of at least 25 psig is preferred with a range of 25 to 50 psig being entirely satisfactory. However, it has been found that by controlling the rate of introduction or the timing of the preblow introduction, the same source of fluid can be used in the preblow which is utilized in the main blow. For instance, fluid under the full pressure (80 to 150 psig, for instance) can be admitted to preblow the parison just as the mold halves begin to close; without ever interrupting the flow the parison will be preblown just as the molds close and thereafter the fluid pressure expands the parison into conformity with the mold. The parison will undergo slight radial expansion as a result of the introduction of the preblow fluid.

It is preferred when operating with parisons at orientation temperature that the mold halves have leading edges contoured so as to have a severing edge which is the furthermost extension thereof; this severing edge cooperates with a matching edge on the opposing mold half to sever the parison. Preferably, these edges are disposed so as to project past a theoretical center line between the two mold parts a distance of 0.5 to 5, preferably 1 to 4, mils. Adjacent a bottle wall forming portion of the sealing and severing section of the mold halves is a second projection which cooperates with a matching projection on the opposing mold half to hold said thus severed parison within a bead forming cavity, to be described hereinbelow. For use with parisons having a wall thickness of 0.075 to 0.225 inch, a leading edge of these holding projections preferably has a land height of 5 to 16, preferably 8 to 12, mils. Between the holding projection and the severing edge of each sealing and severing means is a small cavity which, in cooperation with a matching cavity on the other mold half, forms a bead forming mold. Preferably, this cavity has a circular configuration although other configurations can also be used. This cavity preferably has a maximum lateral dimension of 15 to 25 percent of the combined thickness of the two walls of the parison prior to stretching. For parisons having a wall thickness before stretching of 150 mils, a maximum lateral dimension of this cavity of 45 to 75 mils is satisfactory.

While it is not essential to the invention, it is highly preferred that the sealing and severing means have surfaces sloping back from the severing edge on the side opposite said bead-forming cavity at an angle such that the included angle of the opposed surfaces when the mold parts are in the closed position is within the range of 15° to 100°, preferably 25° to 90°, more preferably 30° to 45°. In this way lateral pressure on the tail portion of the parison which is being severed has a vertical component force which is sufficient to cause the severed tail portion to fall free from the portion of the parison held within the bead-forming cavity.

A "V" or other recess can be machined into the outer surface of the bottom wall forming portion of the mold at right angles to the parting line to accommodate the lowermost extensions of the gripping means so as to allow the parison to be sealed and severed closer to the point at which it is held in the gripping means to thus minimize regrind.

The heating means can be any suitable means for heating parison preforms such as an air oven, a radiant heating chamber or the like which can be utilized to heat the parisons and deliver them, preferably at orientation temperature, in a vertical position to a picker station.

Referring now to the drawings, particulary FIG. 1, there is shown a schematic representation of a blow molding operation utilizing the instant invention. Extruder 10 forms a tubular extrudate 12 which passes to cooling and sizing zone 14 and thence to cutting means 16 where it is cut into individual open end parison preforms 18 which fall into loading hopper 20 of oven 22. Oven 22 is a circulating air oven having a continuous chain 24 with spaced parison support means 25 for conveying parisons 18 therethrough in an upright manner. Radiant heaters 26 provide supplemental heat to aid in more quickly and uniformly heating the parisons to orientation temperature.

Parison transfer mechanism generally designated by reference character 28 transfers the parisons from oven 22 to the molding station generally designated by reference character 30. The construction of transfer mechanism 28 will be described in greater detail hereinbelow. At the point in the cycle depicted in FIG. 1, gripping means designated generally by reference character 32 has grasped the outer end of the parison by means of clamp members 35. Ball bearing spline shaft 34 (see FIG. 3) attached to arm 36 (see FIG. 2) which carries gripping means 32 in raised axially upward so as to lift parison 18 out of the oven. Thereafter shaft 34 rotates about its axis moving parison 18 in an arc stopping with parison 18 positioned directly above thread-forming plug 38. Shaft 34 is then lowered to position the bottom open end of parison 18 over said plug. Thread-forming jaws 40 then close and optionally plug 38 is advanced axially upward an additional distance into the open end of said parison to thus form the thread and/or neck area. Ball spline shaft 34 then moves axially upward again thus stretching the parison between thread forming jaws 40 and clamp members 35. This stretching operation terminates just as the gripping means clears above the top of mold halves 42 and 44. Mold halves 42 and 44 then converge with leading edges 46 of said mold halves severing the parison which is sealed adjacent thereto. The alignment of the clamp members 34 carried by transfer mechanism 28 is such that as these mold halves are closing, the parison, to the extent that it is tilted along a plane parallel to the longitudinal direction of clamp members 35 is straightened up by the closing action of the mold halves because the longitudinal direction of the clamp members 35 as they are disposed above mold halves 42 and 44 is at right angles to the parting line thereof. Fluid pressure is then introduced via line 45 to expand said parison into conformity with the mold cavity to form a biaxially oriented bottle. During this time shaft 34 is rotated to position means 32 over a scrap receiving means 49 whereupon clamp members 35 of means 32 open up to deposit the severed end of parison 18. Rotation of the shaft 34 is continued until means 32, with the clamp members 35 in an open position, is again placed over a parison in oven 22 whereupon shaft 34 descends and clamp members 35 of means 32 close on the parison. The mold halves then open and the thus-formed bottle is removed. By this time transfer mechanism 28 has the next parison ready for positioning over plug 38. Plug 38 is moved axially upward and downward by means of cylinder 39. Jaw means 40 are moved into and out of engagement by means of cylinder 41 and mold halves 42 and 44 are opened and closed by means of air cylinders 43. Air is introduced into the interior of the parison to effect expansion of same via line 45 which feeds into a hollow core of plug 38.

Referring now to FIG. 2, there is shown in simple schematic form a plan view depicting the relationship of the various elements as arm 36 carrying gripping means 32 moves from discharge means 47 at the oven picker station, toward a position over plug 38. Also there is shown scrap chute 49 into which the cut off portion of the parison is deposited on the return of arm 36 into position over discharge means 47. As shown in FIG. 2, plug 38 is disposed so that arm 36 rotates exactly 90 degrees from discharge means 47 so that the clamp means 35 move in a direction perpendicular to the longitudinal direction of member 36 thus when arm 36 is rotated to deposit the parison over plug 38 the longitudinal direction of the clamp means (and thus the longitudinal direction of the flat portion) is parallel to the direction of movement of the mold halves (perpendicular to the parting line thereof). However, the discharge opening 47 could be positioned in any convenient location so long as clamp members 35 are disposed so that on being rotated into position over plug 38 the longitudinal direction thereof is perpendicular to the parting line of the mold halves.

Figure 3:
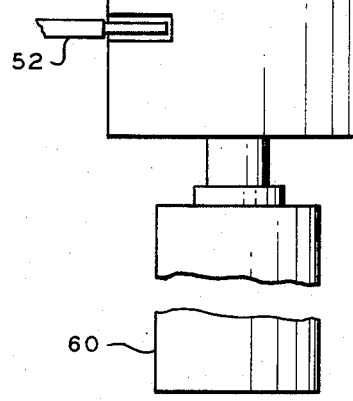
FIG. 3 is a detailed view of the transfer mechanism.

Referring now to FIG. 3, there is shown in greater detail the transfer mechanism 28. As can be seen, shaft 34 is a spline shaft having a plurality of inner race grooves 48 running longitudinally. Shaft 34 is carried by ball nut 50 and a second identical ball nut (not shown) at the bottom of housing. The ball bearings of the ball nuts fit within race grooves 48 to allow longitudinal movement of shaft 34 relative to the ball nuts. Cylindrical housing member 56 is integrally affixed to ball nut 50 and to the other ball nut which is not shown and has lever 52 which serves as a means to rotate member 56 about the longitudinal axis thereof thus rotating the ball nuts and hence spline shaft 34. Member 56 is carried by frame 54 through bearings 58 so as to allow this rotary movement of member 56. Thus spline shaft 34 can move longitudinally relative to frame 54, and member 56 can rotate relative to frame 54, thus effecting rotating of shaft 34. Axial movement of shaft 34 is effected by hydraulic cylinder 60. Attached to the upper end of spline shaft 34 is arm 36 which carries depending gripping means 32 having claim members 35a at the end thereof. Clamp members 35a of FIGS. 3 and 4 are identical to member 35 of FIG. 1 except that they are contoured to fit into a recess in the mold, as shown by "V" groove 68 in FIG. 6.

Figure 5:
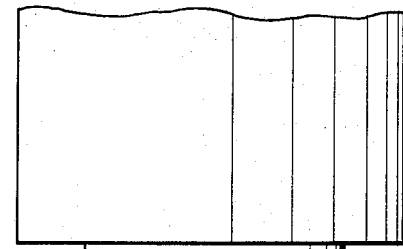
FIG. 5 is a detailed view of the pinch-off portion of the mold halves.

FIG. 5 shows in detail sealing and severing portion of mold halves 42 and 44. As can be seen, these members have leading edges 46 spaced a short distance from the bottom wall forming surface 62 of the mold halves. This allows forming a small bead forming cavity 64. As can be seen, surfaces 66 slope back from leading edges 46.

Figure 6:
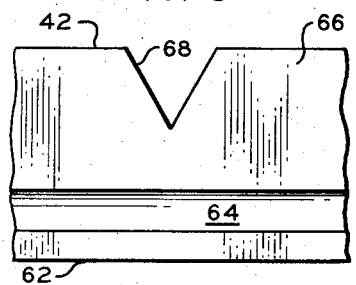
FIG. 6 is a view along line 6—6 of FIG. 5.

FIG. 6 shows an end view of a leading edge of mold half 42 having "V" shaped recess 68 for accommodating the clamp members 35a.

Many conventional parts such as heaters, temperature controllers, frame members and the like have been omitted for the purpose of simplicity but their inclusion is understood by those skilled in the art and is within the scope of the invention.

EXAMPLE

Propylene homopolymer having a density of 0.905 (ASTM D 1505-63T), and a melt flow of 2 (ASTM D 1238-62T, Condition L), and a melting point of about 340° F. was extruded into tubing having an outside diameter of 0.9-inch and a wall thickness of 0.150-inch. The tubing was cooled to room temperature in a vacuum sizing and quenching chamber then cut into 7-inch lengths. These 7-inch lengths were placed on vertically disposed pins carried by a continuous chain within a circulating air oven and passed through said oven. Supplementary heat was imparted by radiant panel heaters. The lengths were heated to a temperature of 320° F. A mechanism essentially identical to that shown in the drawings, utilizing two conventional ball nuts of approximately 3-inch diameter with one of said ball nuts being rotated slightly relative to the other to preload the bearing against the spline, gripped the upper end of the parison flattening same, lifted it axially out of the oven and transferred it through an arc and into position directly over a thread forming plug identical to that shown in the drawings and descended to place the lower end of the parison over said plug. Thread-forming jaws then closed on the parison, the plug was moved axially upward a short distance, the gripping means was raised to stretch the parison so that the portion between the thread-forming jaws and clamp members of the gripping means was stretched to approximately twice its original length. Thereafter preblow air at a pressure of 50 psig was introduced into the interior of the parison to give a slight radial expansion to the parison. Thereafter mold halves were closed on the parison, said parison being disposed so that the longitudinal direction of said flattened end was at right angles to the parting line of said mold halves, the upper portion of said mold halves having a configuration including a bead-forming cavity which produced a tab at the seal area, said upper portion of said mold halves also having a blade means which pinched the parison off adjacent said tab. Thereafter blow air was introduced to expand the parison out into complete conformity with the mold cavity. The parison transfer arm was rotated to a position over a scrap receiving means and the gripping means tongs opened to release the severed upper end of the parison. The mold cavity was then opened and the bottle ejected by blowing additional air through the plug. Total cycle time per bottle per mold was 6 seconds. This was broken down into 4 seconds from the time the mold is closed through the time taken for the parison to become self supporting, and 2 seconds for opening the mold, removing the bottle, inserting the new parison and closing the mold. In other runs, total cycle time was 7 seconds. With the 7 second cycle time the number of rejects was reduced by one for each 5 minutes of operation as compared with an exactly identical operation except wherein the clamping means positioned the parison in the mold with the flat gripped area parallel to the parting line.

While this invention has been described in detail for the purpose of illustration, it is not to be construed as limited thereby but is intended to cover all changes and modifications within the spirit and scope thereof.

I claim:

1. Apparatus for aligning the longitudinal direction of a tubular parison in all vertical planes comprising in combination:
   a parison heating means including means to deliver heated parisons in an upright position into place below a discharge means in a top portion of said heating means;
   vertically disposed plug means;
   jaw means, and means to move said jaw means, said jaw means being adapted to cooperate with said plug means to form a neck finish on one end of a parison;
   a vertically disposed axially slidable shaft which is rotatable about its longitudinal axis;
   an arm carried by said shaft extending outward from an upper end of said shaft;
   gripping means extending down from an end of said arm, said gripping means having opposed clamp members at an end thereof to grip one end of a parison;
   means to move said shaft axially up and down and means to rotate same about said axis so as to position said parison between said mold means with the longitudinal direction of said clamp members at a right angle to a parting line of a split mold means; and,
   means to introduce fluid pressure into the interior of said parison.

2. Apparatus according to claim 1 wherein said shaft is carried by at least one ball nut, said at least one ball nut being carried by bearing means.

3. Apparatus according to claim 1 wherein said heating means comprises an air oven with supplemental radiant panel heaters and an endless chain for conveying said parisons through said oven.

4. Apparatus according to claim 1 comprising in addition means to move said plug axially upward and downward.

5. Apparatus according to claim 2 wherein said means to move said shaft axially and said means to rotate same about said axis are adapted so as to move said gripping means down and position said gripping means adjacent a parison in said oven and grasp the parison, to thereafter move said gripping means upward thus lifting said parison out of said oven, to thereafter move said gripping means through an arc stopping directly above said plug, to thereafter move said gripping means downward to position an open end of said parison over said plug, and thereafter to move said gripping means up thus stretching said parison after said means to close said jaw means on said open end of said parison has been actuated.

6. Apparatus according to claim 1 wherein said split mold has a recess at right angles to the parting line to accommodate lowermost extensions of said clamp members.

7. Apparatus according to claim 1 wherein mold halves of said split mold each have leading severing edges spaced a short distance from bottom wall forming surfaces thereof with a bead-forming cavity between said severing edges and said bottom wall forming surfaces.

* * * * *